(12) United States Patent
Adams et al.

(10) Patent No.: US 11,671,249 B1
(45) Date of Patent: Jun. 6, 2023

(54) APPARATUS FOR GENERATING AN ACTION-BASED COLLECTIVE

(71) Applicant: Gravystack, Inc., Phoenix, AZ (US)

(72) Inventors: Travis Adams, Phoenix, AZ (US); Chad Willardson, Phoenix, AZ (US); Scott Donnell, Phoenix, AZ (US)

(73) Assignee: Gravystack, Inc., Phoenix, AZ (US)

( * ) Notice: Subject to any disclaimer, the term of this patent is extended or adjusted under 35 U.S.C. 154(b) by 0 days.

(21) Appl. No.: 17/872,996

(22) Filed: Jul. 25, 2022

(51) Int. Cl.
*H04L 9/08* (2006.01)
*H04L 9/32* (2006.01)
*G06N 5/022* (2023.01)

(52) U.S. Cl.
CPC .......... *H04L 9/0861* (2013.01); *G06N 5/022* (2013.01); *H04L 9/3213* (2013.01); *H04L 9/3268* (2013.01)

(58) Field of Classification Search
CPC ... H04L 9/0861; H04L 9/3213; H04L 9/3268; G06N 5/022
See application file for complete search history.

(56) References Cited

U.S. PATENT DOCUMENTS

| | | | |
|---|---|---|---|
| 10,630,751 B2 * | 4/2020 | Bhaya | G06F 40/279 |
| 10,972,479 B2 * | 4/2021 | Clark | G06F 9/5072 |
| 11,093,886 B2 * | 8/2021 | Bhatt | G06V 10/82 |
| 2021/0011757 A1 * | 1/2021 | Duesterwald | G06F 18/217 |

* cited by examiner

*Primary Examiner* — Beemnet W Dada
(74) *Attorney, Agent, or Firm* — Caldwell Intellectual Property Law

(57) ABSTRACT

An apparatus and method for generating an action-based collective associated with an action datum waypoint. A first action datum waypoint is completed and an indication of the completion of the assignment is submitted to a processor. The processor generates a subsequent action datum waypoint using machine-learning to analyze the completed action datum waypoint and any skills that are associated. A token certificate is generated that is associated with the completion of the action datum waypoint. The token certificate may be associated with the action datum identifier that completed the action datum waypoint.

18 Claims, 6 Drawing Sheets

US 11,671,249 B1

APPARATUS FOR GENERATING AN ACTION-BASED COLLECTIVE

FIELD OF THE INVENTION

The present invention generally relates to the field of cryptography. In particular, the present invention is directed to generating an action-based collective associated with completion of an action.

BACKGROUND

Action waypoints are not customizable for each user. There is a need for a way to customize waypoints for each user.

SUMMARY OF THE DISCLOSURE

In an aspect an apparatus for generating an action-based collective includes at least a processor, and a memory connected to the at least a processor, the memory containing instructions configuring the at least a processor to retrieve a first action datum waypoint, select a subsequent action datum waypoint, detect an edge connecting the first action datum waypoint to the subsequent action datum waypoint, and generate a token certificate.

In another aspect a method for generating an action-based collective includes retrieving a first action datum waypoint, selecting a subsequent action datum waypoint, detecting an edge connecting the first action datum waypoint to the subsequent action datum waypoint, and generating a token certificate.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating an action-based collective. Aspects of the present disclosure can be used to create a collective of achievements and waypoints that have been completed after finishing various actions. Aspects of the present disclosure can also be used to generate a token certificate as a function of a completed waypoint. This is so, at least in part, because in order to generate a collective of achievements, a measurable form of achievements. such as tokens, are involved. Exemplary embodiments illustrating aspects of the present disclosure are described below in the context of several specific examples.

Figure 1:
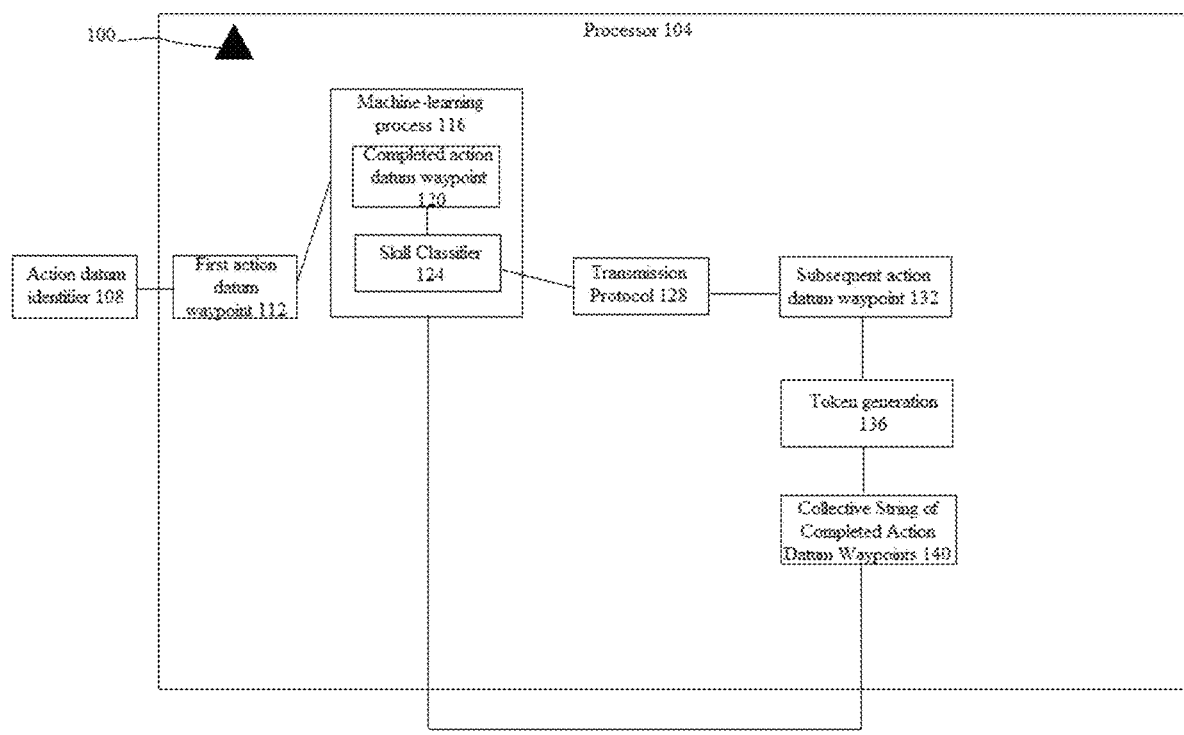
FIG. 1 is a flow diagram illustrating an apparatus for generating an action-based collective.

Referring now to FIG. 1, an exemplary embodiment of an apparatus 100 for generating an action-based collective is illustrated. System includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, in some embodiments, processor 104 may include optical character recognition or optical character reader (OCR). These may allow automatic conversion of images of written (e.g., typed, handwritten or printed text) into machine-encoded text. This may be used to extract information from survey data and transform it into a machine-readable form. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4-5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, a graphical user interface (GUI) may include a plurality of lines, images, symbols. GUI may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referencing FIG. 1, processor 104 receives an indication of a completion of a first action datum waypoint 112 by action datum identifier 108. An "action datum identifier," as used herein, is data identifying a user who may engage in an action as described in an action posting. An "action posting," as used herein, is an action that has been made viewable for engagement with an action identifier. For example, action datum identifier 108 may be a child who wants to be a doctor. Processor 104 may introduce an action posting that comprises of a game to match different bones to different parts of the body. The action identifier engages with the game and upon completion, may move onto the next action posting. The term "engage," as used herein, means to participate, or become involved in. A "first action datum waypoint," as used herein, is the initial action datum that the action datum identifier completed. First action datum waypoint 112 corresponds to the initial action that may correspond to a goal that the action datum identifier has selected. A "goal," as used herein, refers to an objective or subject that the action datum identifier wants to engage with. For example, action datum identifier may be a child who wants to familiarize themselves with the subject of algebra. The goal of the action datum identifier is to learn algebra so the first action datum waypoint may include some base level mathematics functions to solve. The first action datum waypoint may set a baseline level of knowledge that the action datum identifier already has.

Still referencing FIG. 1, action datum identifier 108 initiates processor 104 to begin the generation of an action-based collective when first action datum waypoint 112 is received. Retrieval of first action datum waypoint 112 may prompt machine-learning process 116 to use the completed action datum waypoint 120 in combination with the skill classifier to generate subsequent datum waypoint 132. A "machine-learning process," as used herein, is a branch of artificial intelligence and computer science which focuses on the use of data and algorithms to imitate the way that humans learn. A machine-learning process also refers to the process of making a system that can learn and improve by itself, after being specifically programmed. An example of a machine-learning process is image recognition. Imagine recognition occurs when a processor can identify an object as a digital image and obtain qualities of that image through use of various specific programs. Another example of machine-learning process that may be used is speech recognition. Speech recognition can be used to translate speech into text, such as voice search, voice dialing, appliance control, etc. Machine-learning process 116 may use training data that may contain a plurality of inputs correlated to a plurality of outputs containing completed action datum waypoints 120. A "plurality of inputs," as used herein, refers to information relating to first action datum waypoint and action datum identifier. For example, plurality of inputs may comprise of any answers given to any prompts that the first action datum waypoint displays for the action datum identifier to engage with. A "plurality of outputs," as used herein, refers to information relating to information obtained based on answers given to prompts that the first action datum waypoint displays. For example, a plurality of outputs may provide information on which subjects an action datum identifier needs to engage more with and which subject areas the action datum identifier is already knowledgeable about. A "completed action datum waypoint," as used herein refers to an action datum waypoint that has been fulfilled by the action datum identifier. For instance, if processor 104 generates an algebraic quiz for action datum identifier to engage with, upon answering all prompts displayed by the action datum waypoint, the action datum waypoint would be considered a complete action datum waypoint.

Still referencing FIG. 1, machine-learning process 116 may also use skill classifier 124 to generate subsequent action datum waypoints 132. A "skill classifier," as used herein, refers to a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. A "subsequent action datum waypoint," as used herein, refers to an action datum waypoint that is available to action datum identifier after completion of a previous action datum waypoint. For example, if action datum identifier completes the first action datum waypoint dealing with basic algebra, the subsequent action datum waypoint may prompt the action datum identifier to engage with intermediate level algebra problems. Classification may use associations between action datum waypoints to generate subsequent action datum waypoints. The term "associations" as used herein, refers to a connection or cooperative link between at least one action datum waypoint. Skill classifier 124 may also be trained with pairs of action datum identifier inputs and action datum waypoint data that are correlated to other action waypoint data. A classifier trained with pairs of action datum identifier inputs may take the action datum identifier's status and another input regarding a goal to generate a subsequent action datum waypoint, while a classifier without trained pairs of data could just generate a subsequent action datum waypoint based on the current status. "Training data" as used herein, is data containing correlations that a machine-learning process may use to model relationships between two or more categories of data elements. Training data in this instance may come from action datum waypoint data and completed action datum waypoint data. Action datum waypoint data may provide the machine-learning process with information pertaining to strengths and weaknesses an action datum identifier may have. This information may be used as training data to allow machine-learning process 116 to learn and develop more efficient and directed subsequent action datum waypoints and action datum waypoint paths for other action datum identifiers.

A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referencing FIG. 1, Skill classifier 124 may be configured to harness information including, but not limited to, strength-based, weakness-based, skill traversal, etc. recommendations. As used herein, a "strength" is a beneficial attribute of action datum identifier 108. As used herein, a "beneficial attribute" is a desirable quality and/or characteristic. For example, a strength may include confident public speaking, budgeting, math theory, or the like. As used herein, a "weakness" is a negative attribute of action datum identifier 108. As used herein, a "negative attribute" is an undesirable quality and/or characteristic. For example, a weakness may include fear of public speaking or poor reading comprehension. In an embodiment, a strength may be used within skill classifier 124 to a strength category. Machine-learning process 128 may be iterative such that outputs of the skill classification algorithm may be used as future inputs of the algorithm. In another embodiment, a weakness may be used within skill classifier 124 to a weakness category. This may allow the skill classifier 124 to evolve. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. The strength and weakness assessments may also be used as another input for which skill classifier 124 is trained. Additional disclosure related to strength-based recommendations may be found in U.S. patent application U.S. Ser. No. 17/872,857 entitled "APPARATUS AND METHODS FOR ANALYZING STRENGTHS," the entirety of each which in incorporated herein by reference. Additional disclosure related to weakness-based recommendations may be found in U.S. patent application U.S. Ser. No. 17/872,950 entitled "AN APPARATUS AND METHOD FOR ANALYZING DEFENCIES," the entirety of which in incorporated herein by reference.

Still referring to FIG. 1, processor 104 may utilize a knowledge-based system (KBS) to use skill classifier 124 to perceive action datum identifier's 108 response as a strength or weakness. As used in this disclosure, a KBS is a computer program that reasons and uses a knowledge base to solve complex problems. A KBS may scrape websites to gain knowledge for the knowledge base. As used herein, a "knowledge base" is an established collection of information and resources. The KBS has two distinguishing features: a knowledge base and an inference engine. A knowledge base may include technology used to store complex structured and unstructured information used by a computer system, often in some form of subsumption ontology rather than implicitly embedded in procedural code. Other common approaches in addition to a subsumption ontology include frames, conceptual graphs, and logical assertions. In some embodiments, the knowledge base may be a storage hub that contains information about past matches of a skills data set 108 to a strength 132 based on the similarity of inputs and feedback from users and system administrators about the compatibility of matches. Next, an inference engine allows new knowledge to be inferred. For example, the inference engine may determine that action datum identifier 108 system has a skills classifier with attributes that demonstrate a strength of project management, the system may then infer that subsequent datum waypoints may include going back to school for a Masters in Business Administration (MBA). In another example, the inference engine may infer a strength based on the skill classifier 124. Inferences can take the form of IF-THEN rules coupled with forward chaining or backward chaining approaches. Forward chaining starts with the known facts and asserts new facts. Backward chaining starts with goals and works backward to determine what facts must be asserted so that the goals can be achieved. Other approaches include the use of automated theorem provers, logic programming, blackboard systems, and term rewriting systems such as CHR (Constraint Handling Rules). The inference engine may receive constant feedback and self-learn based on previous classifications, as described through this disclosure, and recommendations to further refine and strengthen its recommendations.

Continuing to reference FIG. 1, each strength and weakness that the skills classifier 124 categorizes to may be assigned score based on the skill level of the user. For example, the skills classifier 124 may be match to a strength 132 of budgeting based on completion of first action datum waypoint 112. The strength may be scored with a numerical integer between 1-10, wherein 10 is the total mastery of a skill. The scoring of a strength may be determined using a scoring function as described below. In another embodiment, the scoring of the strength may be determined by survey data. For example, if a action datum identifier 108 gets a question on the survey wrong within an action datum waypoint, it may deduct points. The score may also be generated by self-ranking, which may be present in first action datum waypoint 112. The score of the strength may be used to determine the subsequent action datum waypoint 132. For example, if action datum identifier 108 receives a 2 as the score for a strength, they may be presented with entry level courses for the subsequent action datum waypoint 132. Alternatively, if action datum identifier 108 receives an 8 as their score for a strength, they may be presented with advanced level courses for the subsequent action datum waypoint 132.

Continuing reference to FIG. 1, processor 104 may detect an edge connecting the first action datum waypoint 112 to the subsequent action datum waypoint 132. An "edge" as used herein, refers to a path or line connecting the action datum waypoints after it has been determined that the action datum identifier has completed the task corresponding to the second waypoint. An edge may be generated based on the completion of an action, task, and/or accomplishment. For example, where a first action waypoint corresponds to completion an introductory quiz on algebra, the processor would detect an edge that allows the processor to generate a subsequent quiz utilizing the skills that an action datum identifier has picked up during the first action datum waypoint (the introductory quiz). Completion of the introductory quiz on algebra can prompt the processor to create a path or line that connects future quizzes on algebra to the first introductory quiz that the action datum identifier completed.

Edge detection may use a machine-learning process to generate subsequent action datum waypoints that align with the first action datum waypoint. Detection may occur based on completion of an action datum waypoint. Detection of an edge may trigger transmission of a subsequent action datum waypoint 132 to an action datum identifier 108. Processor 104 may detect the edge by receiving data indicating action datum waypoint completion and verifying that the action datum waypoint has been completed based on the action datum waypoint task.

Referencing FIG. 1, processor 104 may be configured detect an edge by verifying the completion of an action datum waypoint or subsequent action datum waypoint 132. In an embodiment, an action datum waypoint may be verified using an image processing module. An image processing module may analyze input data to ensure that images are original and not modified. If data is in a static document or image frame, processor 104 may use an "offline" process which can detect handwriting movements and use that to verify action datum identifier identity or task completion. Using OCR processes, which are further described above, action datum waypoint data may be verified through use of pre-processing image components. Processor 104 may be able to identify the action datum identifier and completed action datum waypoints through the process of clearing up images, emphasizing task features, extracting task features, and the like. By extracting key components of data that the action datum identifier submitted, the computer can parse through data related to the action datum waypoint and verify its completion. Additional disclosure related to verifying task completion may be found in U.S. patent application U.S. Ser. No. 17/872,254 entitled "AN APPARATUS AND METHOD FOR GENERATING A TOKEN CERTIFICATE ASSOCIATED which is incorporated herein by reference.

Still referencing FIG. 1, subsequent action datum waypoint 132 may be transmitted to action datum identifier 108 through a transmission protocol 128. The term "transmitted" as used herein, refers to the process passing information to the action datum identifier after an edge has been detected. For instance, subsequent action datum 132 may be transmitted to action datum identifier 108 through an emailed notification or mobile phone alert after an edge has been detected. Once action datum identifier 124 has been verified and engages with subsequent action datum waypoint 132, they may receive an email or text notification that an action datum has been transmitted to their account for viewing. The term "transmission protocol" as used herein, refers to the process by which the subsequent action datum waypoint is transferred to the action datum identifier after an edge has been detected. Transmission protocol 128 may require that an action datum identifier provides their signature affirming that the action datum waypoint was completed to the best of their ability and the action datum identifier 108 did not obtain assistance from any third-party sources. a "third party source" as used herein, refers to any user or party that is not the action datum identifier. Transmission protocol 128 may also require that the action datum identifier 108 provides photographic evidence that they are the only users who are viewing and completing the action datum waypoint.

Still referencing FIG. 1, completion of subsequent action datum waypoint 132 may prompt processor 104 to conduct token generation 136. A "token generation," as used herein, refers to the process of generating a unique token certificate. A "token certificate," as used herein, refers to a unique and non-interchangeable unit of data stored on a ledger representing ownership of an asset and/or a financial interest. An example of a token certification is a non-fungible token (NFT). As used in this disclosure, a "ledger" is a digital immutable ledger where data entries may be posted and cannot be altered. Accordingly, token certificate may prove ownership of an asset. An asset may include an achievement, physical artwork, digital artwork, music, in-game items, videos, photographs, real estate, and the like. In an embodiment, token certificate may be a virtual embodiment of an achieved objective and/or completed assignment. Additionally, other action datum waypoints or edges may be represented by a token certificate or other NFTs using the same token generation processes.

A cryptographic accumulator may be used to represent data describing an action datum waypoint, subsequent action datum waypoints, edges, and/or other data associated with an action datum waypoint. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root 308, and therefore was included in the original larger data set.

Additional disclosure related to token certificates and token generation may be found in U.S. patent application U.S. Ser. No. 17/872,254 entitled "AN APPARATUS AND METHOD FOR GENERATING A TOKEN CERTIFICATE ASSOCIATED WITH AN ASSIGNMENT," the entirety of which is incorporated herein by reference.

A token certificate may be stored on an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement a ledger, where data entries that have been posted to the immutable sequential listing cannot be altered. An immutable sequential listing may include a directed acyclic graph. Ledger may be distributed across some or all nodes on a network, such as a peer-to-peer network, whereby each node replicates and saves an identical copy of the ledger and updates itself independently. A common example of an immutable sequential listing is a blockchain. Immutable sequential listing may include multiple immutable sequential listings. Immutable sequential listing may include shared and synchronized digital data which may be spread across multiple sites. Immutable sequential listing 136 may be stored and/or implemented on two or more nodes that may be connected by a network, such as on a peer-to-peer network. A node may include a device such as processor 104, any remote device, or the like. Nodes may be connected by a network and share information through a ledger that is distributed. There may be no central administrator or centralized data storage of information and/or data located on immutable sequential listing. As information is entered onto and updated on ledger shared by nodes on a network, each node may construct a new transaction. Nodes may then vote by a consensus algorithm as to which copy is correct. Consensus algorithms may include proof of work, proof of stake, or voting systems. Once a consensus has been determined, all other nodes may update themselves to reflect the new copy of the ledger. In some embodiments, nodes may copy ledger in its entirety. In other embodiments, nodes may copy one or more portions of ledger. Nodes may be connected through a peer-to-peer networking whereby nodes are equally privileged and equipotent participants. A peer-to-peer network may include a network of nodes that may make a portion of their resources available to other network participants. This may include resources such as processing power, disk storage or network bandwidth. Nodes located on a peer-to-peer network may both supply and consume resources. Apparatus 100 may utilize cryptographic keys and digital signatures to ensure node security and/or authenticity.

Continuing to reference FIG. 1, token generation may include information of the asset, such as a unique fingerprint of the asset file, a token name, a token symbol, and/or a link to a file posted on an interplanetary file system ("IPFS"). Processor 104 may be configured to conduct token generation 136. Token certificate may be included in a ledger as part of immutable sequence listing. Token certificate may include a plurality of token certificates. Token certificate may be accessible at any of various security settings; for instance, and without limitation, token certificate may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Token certificate may exist in more than one level, including, without limitation, a first access level or community of permitted entities and/or devices having ability to read, and a second access level or community of permitted entities and/or devices having ability to write; first and second community may be overlapping or non-overlapping. Processor 104 may be configured to record in immutable sequence listing various events such as a creation of token certificate, an initial acquisition of the token certificate, any sales and/or resales of shares of token certificates, tickets based on token certificates, or the like, including without limitation the identity of the seller and purchaser, the purchase price, and/or a timestamp of the transaction.

Continuing to reference FIG. 1, token certificate may be associated with action datum identifier 108. Action datum identifier 108 may own token certificate upon the verification of evidence associated with subsequent action datum waypoint 132. Action datum identifier 108 may provide their information, such as their name, email, phone number, username, and/or other personal identifying information may be associated with token certificate. In an embodiment, the token certificate and the associated owner, which may be action datum identifier 108, may be shared and visible to other people with access to the immutable sequential listing.

Still referencing FIG. 1, in an embodiment, apparatus 100 may allow people, such as employers, or the like, to view the collective string of completed action datum waypoints 140 completed by action datum identifier 108. A "collective string of completed action datum waypoints," as used herein, refers to a compilation of all action datum waypoints and associated tokens that an action datum identifier 108 has been awarded. For example, if action datum identifier completes twenty subsequent action datum waypoints in the field of algebra, a future employer may be able to view the action datum waypoints and tokens that were awarded as part of the action datum waypoint protocol. An example of a collective string of completed action datum waypoints is a resume. A "resume" as used herein, refers to a collection of information that can be displayed or generated on paper, another document, token-based network, and the like. The resume could be represented by a token or other blockchain entry that links other token certificates. A cryptographic accumulator, for instance, could tie token certificates together using Merkle branches, or the like, to each task. A resume or collective string may present completed action datum waypoints and edges graphically, or with similar audio or visual displays. Additionally, a collective string of completed actions can be represented through audio, visual or audio-visual displays of completed tasks, such as PowerPoint, Prezi, audio recordings of completed tasks, video snippets of completed tasks, and the like. The "action datum waypoint protocol," as used herein, refers to the process by which the action datum identifier completes the first action datum waypoint for a goal and then progresses through the subsequent action datum waypoints until mastery of the subject is obtained. The term "mastery," as used herein, refers to a level of confidence within a particular subject that allows an action datum identifier to complete tasks associated with the subject with ease. For instance, action datum identifier 108 wants to learn more about the subject of American History. The action datum identifier completed the first action datum waypoint dealing with American History then progresses through subsequent action datum waypoints dissecting niche sectors of American History and the expansion through Western America. The action datum protocol allows action datum identifier to progress through subsequent action datum waypoints at a pace that is in tune with action datum identifier's knowledge of the subject and awards action datum identifier a token for each action datum waypoint level completed.

Figure 2:
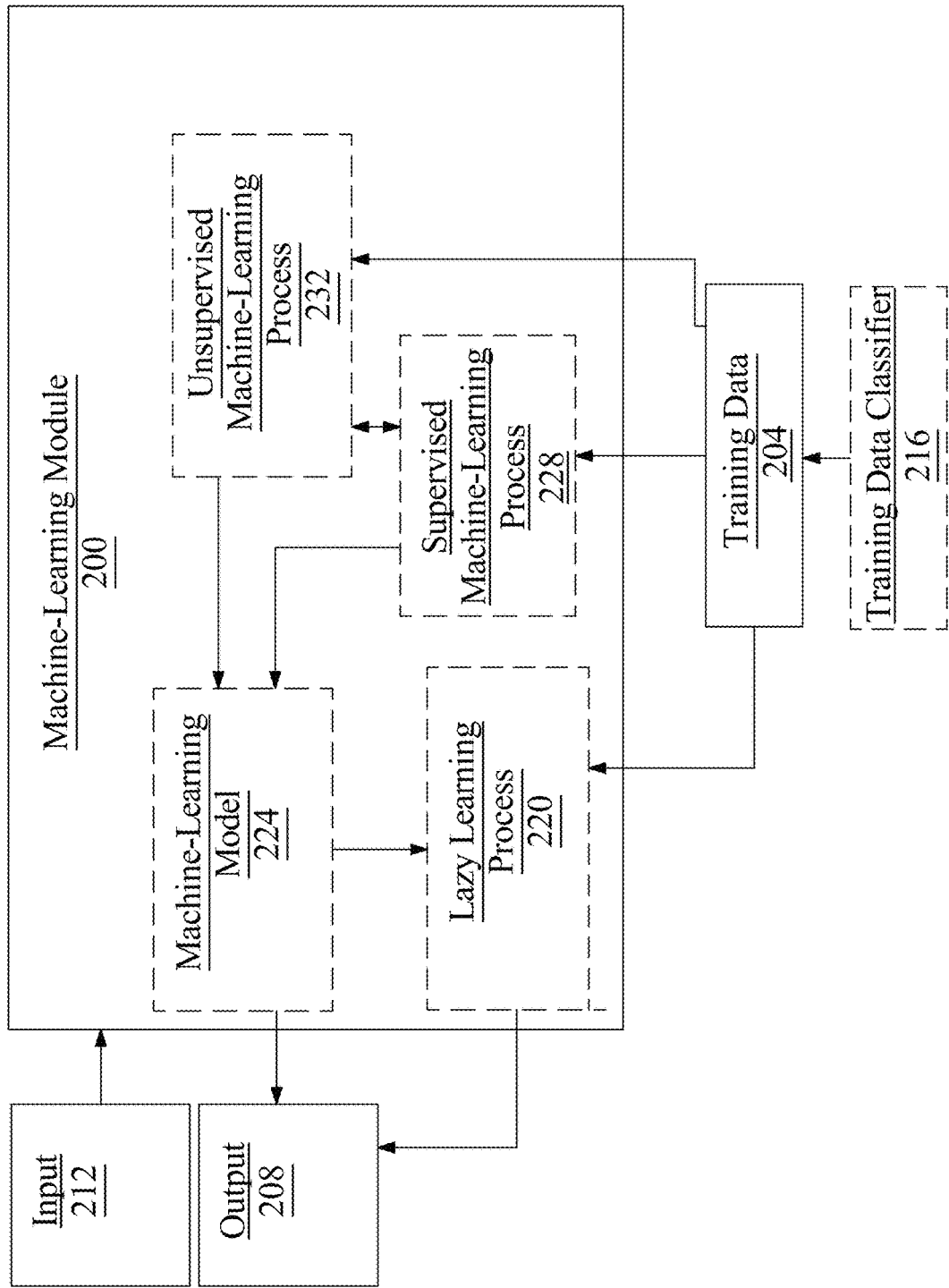
FIG. 2 is a block diagram of exemplary machine-learning processes.

Referring now to FIG. 2, an exemplary embodiment of a machine-learning module 200 that may perform one or more machine-learning processes as described in this disclosure is illustrated. Machine-learning module 200 may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input 212 data as described in this disclosure to any output 208 data as described in this disclosure.

Further referring to FIG. 2, training data 204 may be filtered, sorted, and/or selected using one or more supervised and/or unsupervised machine-learning processes 222 and/or models as described in further detail below; such models may include without limitation a training data classifier 216. Training data classifier 216 may include a "classifier," which as used in this disclosure is a machine-learning model 224 as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output 208 at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process and/or protocol, which may alternatively be referred to as a "lazy loading" or "call-when-needed" process and/or protocol, may be a process whereby machine learning is conducted upon receipt of an input 212 to be converted to an output 208, by combining the input 212 and training set to derive the algorithm to be used to produce the output 208 on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning 220 may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models. A "machine-learning model," as used in this disclosure, is a mathematical and/or algorithmic representation of a relationship between inputs and outputs, as generated using any machine-learning process including without limitation any process as described above and stored in memory; an input 212 is submitted to a machine-learning model 224 once created, which generates an output 208 based on the relationship that was derived. For instance, and without limitation, a linear regression model, generated using a linear regression algorithm, may compute a linear combination of input 212 data using coefficients derived during machine-learning processes to calculate an output datum. As a further non-limiting example, a machine-learning model may be generated by creating an artificial neural network, such as a convolutional neural network comprising an input 212 layer of nodes, one or more intermediate layers, and an output 208 layer of nodes. Connections between nodes may be created via the process of "training" the network, in which elements from a training data 804 set are applied to the input 212 nodes, a suitable training algorithm (such as Levenberg-Marquardt, conjugate gradient, simulated annealing, or other algorithms) is then used to adjust the connections and weights between nodes in adjacent layers of the neural network to produce the desired values at the output 208 nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process 232, as used herein, is a process that derives inferences in datasets without regard to labels; as a result, an unsupervised machine-learning process 232 may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
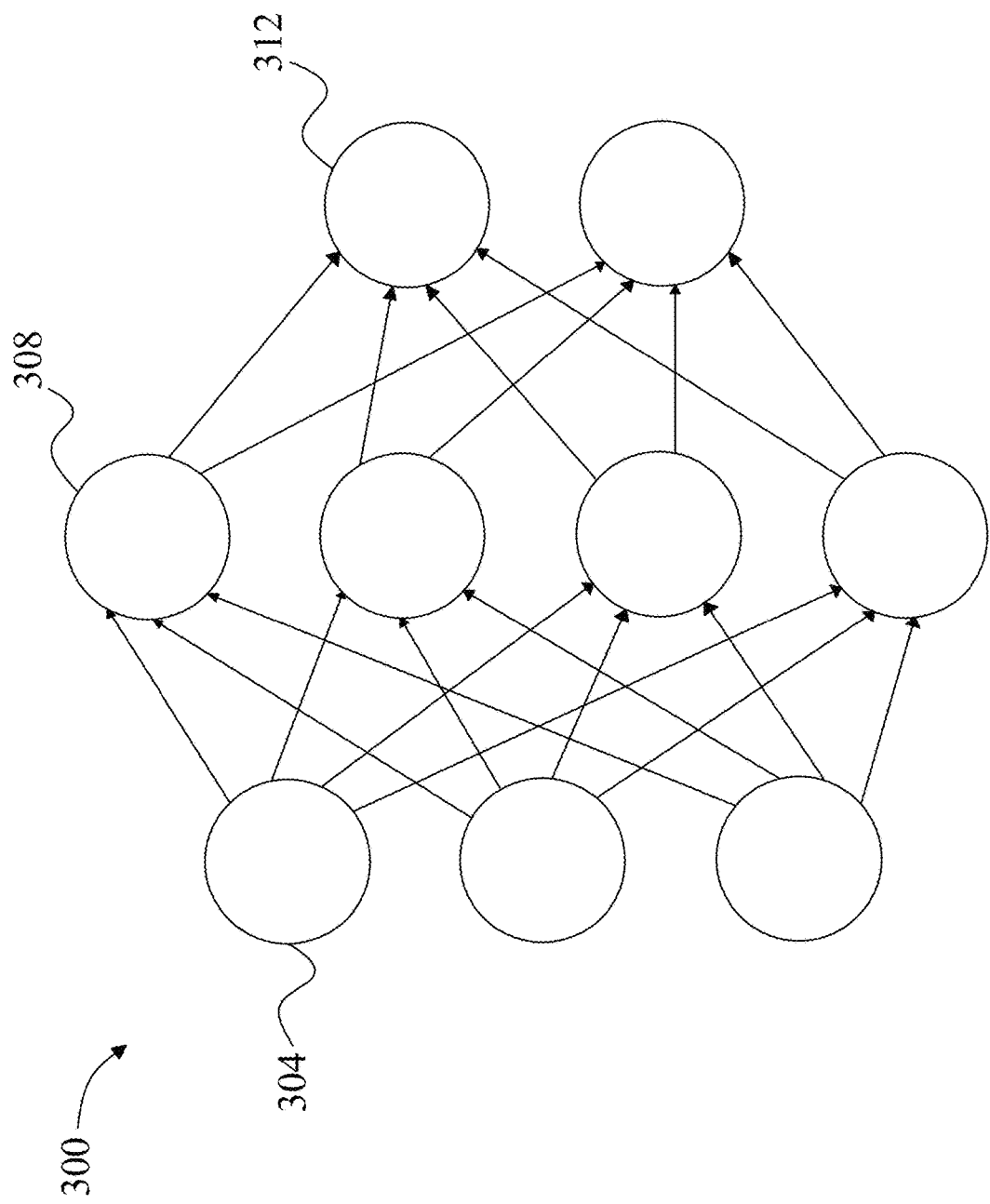
FIG. 3 illustrates an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
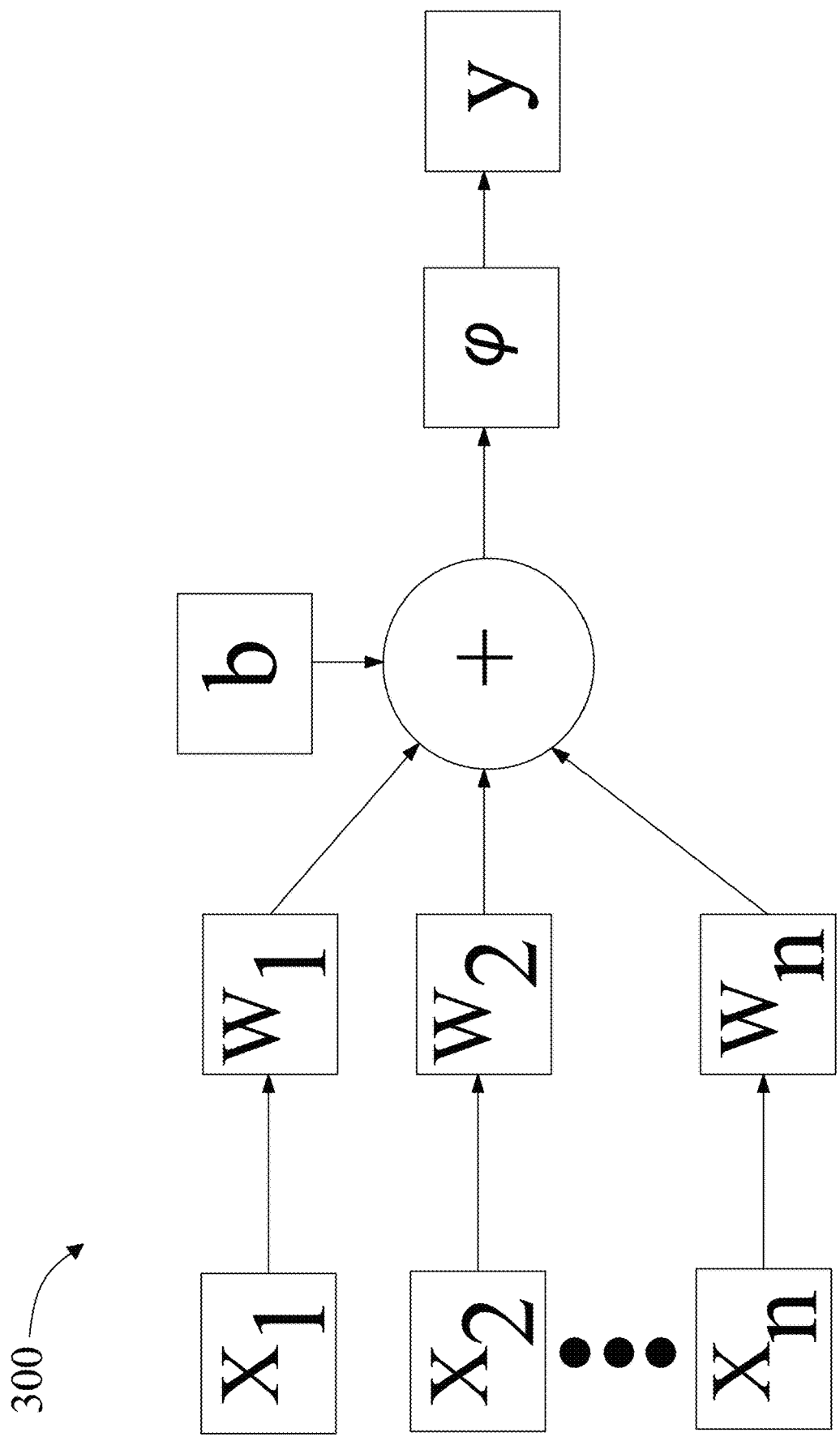
FIG. 4 a block diagram of an exemplary embodiment of a node of a neural network.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
FIG. 5 is a flow diagram illustrating a method for generating an action-based collective.

Now referencing FIG. 5, a flow diagram of method 500 for generating an action-based collective shown. Step 505 of method 500 includes retrieving a first action datum waypoint. A first datum waypoint may be associated with an action datum identifier. First action datum waypoint may be associated with an action that the action datum identifier engages with. This may be implemented as disclosed with references to FIGS. 1-4 above.

Step 510 of method 500 includes selecting a subsequent action datum waypoint. Subsequent action datum waypoint may be associated with a completed action datum waypoint. Machine-learning may be used to generate the subsequent action datum waypoint. This may be implemented as disclosed with references to FIGS. 1-4 above.

Step 515 of method 500 includes detecting, by a processor, an edge connecting the first action datum waypoint to the subsequent action datum waypoint. An edge may be generated based on completion of an action datum waypoint. This may be implemented as disclosed with references to FIGS. 1-4 above.

Step 520 of method 500 includes generating a token certificate. A token certificate may be associated with a completed action datum waypoint. A token certification may also be associated with an action datum identifier. A compilation of token certificates may be available to a third party for viewing. This may be implemented as disclosed with references to FIGS. 1-4 above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
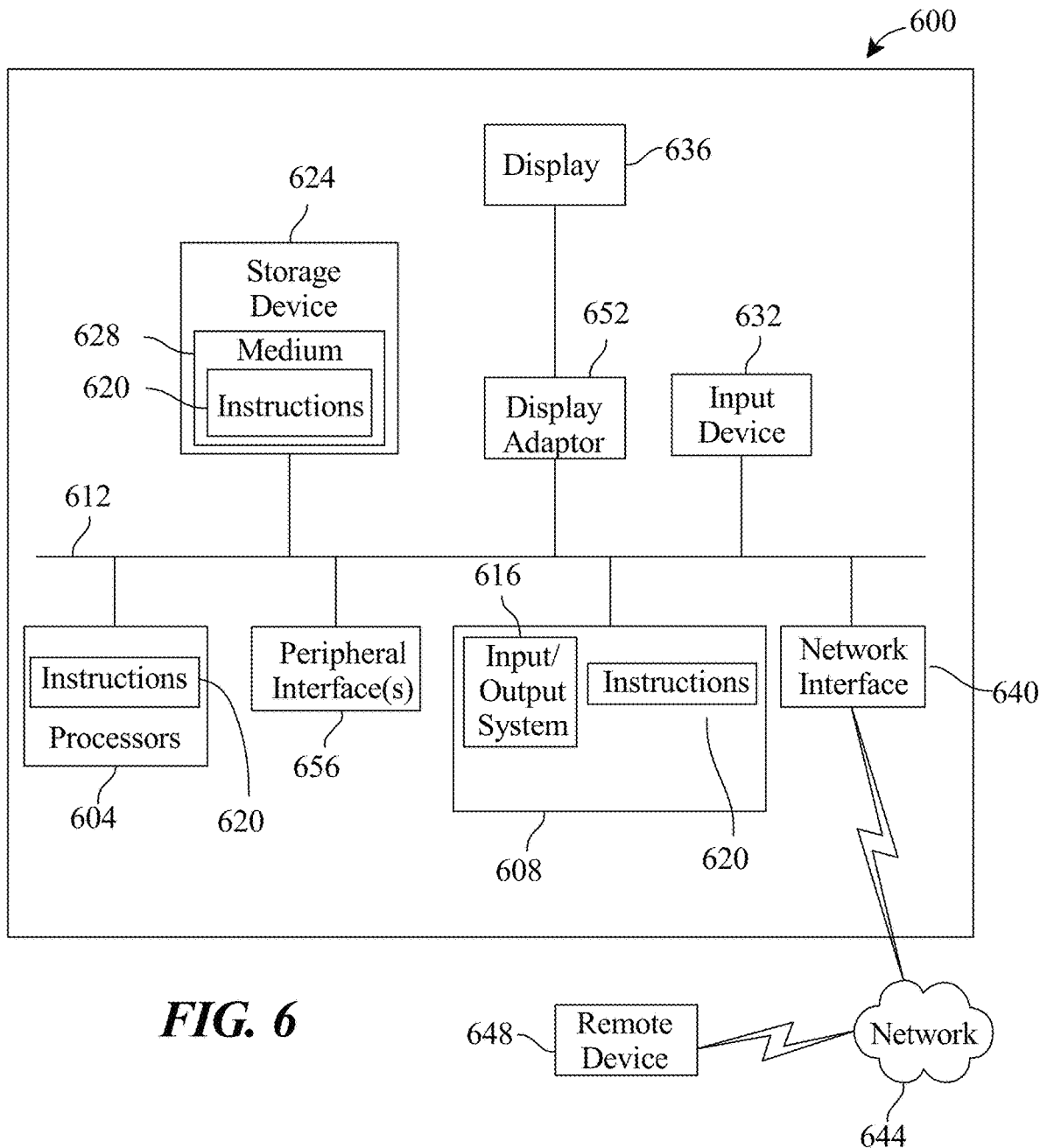
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an action-based collective, the apparatus comprising:
   at least a processor; and
   a memory connected to the at least a processor, the memory containing instructions configuring the at least a processor to:
   retrieve a first action datum waypoint wherein the first action datum waypoint identifies a completed action datum by an action datum identifier;

select a subsequent action datum waypoint, wherein selecting the subsequent action datum waypoint further comprises:
  training a machine-learning model using training data comprising a plurality of inputs containing action identifier information correlated to a plurality of outputs containing completed action datums waypoints;
  receiving the completed first action datum waypoint; and
  selecting the subsequent action datum waypoint as a function of a skill obtained from the first action datum waypoint;
detect an edge connecting the first action datum waypoint to the subsequent action datum waypoint; and
generate a unique token as a function of the detected edge.

2. The apparatus of claim 1, wherein the memory contains instructions further configuring the at least a processor to:
receive the first action datum waypoint;
generate the subsequent action datum waypoint as a function of the first action datum waypoint.

3. The apparatus of claim 1, wherein retrieving the subsequent action datum waypoint further comprises receiving an action identifier corresponding to the subsequent action datum.

4. The apparatus of claim 3, wherein retrieving the second action datum waypoint further comprises initiating an action datum waypoint protocol as a function of the action identifier.

5. The apparatus of claim 1, wherein detecting an edge connecting the first action datum waypoint to the subsequent action datum waypoint further comprises:
receiving the completed action datum waypoint from the action datum identifier; and
transferring the completed action waypoint to the subsequent action datum waypoint using a transmission protocol.

6. The apparatus of claim 1, wherein selecting the subsequent action datum waypoint further comprises selecting the subsequent action datum waypoint as a function of a strength and a weakness assessment corresponding to the first action datum waypoint.

7. The apparatus of claim 1, wherein generating a token as a function of the input from the action datum waypoint comprises the action identifier completing the action datum waypoint.

8. The apparatus of claim 1, wherein detecting an edge further comprises connecting completed action datum waypoints.

9. The apparatus of claim 1, further comprising storing a collective string of completed action datum waypoints.

10. A method for generating an action-based collective the method comprising:

retrieving, by a processor, a first action datum waypoint wherein the first action datum waypoint identifies a completed action datum by an action datum identifier;
selecting, by the processor, a subsequent action datum waypoint, wherein selecting the subsequent action datum waypoint further comprises:
  training a machine-learning model using training data comprising a plurality of inputs containing action identifier information correlated to a plurality of outputs containing completed action datums waypoints;
  receiving the completed first action datum waypoint; and
  selecting the subsequent action datum waypoint as a function of a skill obtained from the first action datum waypoint;
detecting, by the processor, an edge connecting the first action datum waypoint to the subsequent action datum waypoint; and
generating, by the processor, a unique token as a function of the detected edge.

11. The method of claim 10, wherein the memory contains instructions further configuring the at least a processor:
receiving, by a processor, the first action datum waypoint;
generating, by a processor, the subsequent action datum waypoint as a function of the first action datum waypoint.

12. The method of claim 10, wherein retrieving the subsequent action datum waypoint further comprises identifying the completed action datum waypoint and the action identifier.

13. The method of claim 10, wherein retrieving the action datum waypoint further comprises the action identifier initiating an action datum waypoint protocol.

14. The method of claim 10, wherein detecting an edge connecting the first action datum waypoint to the subsequent action datum waypoint further comprises:
receiving, by a processor, the completed action datum waypoint from the action datum identifier; and
transferring, by a processor, the completed action waypoint to the subsequent action datum waypoint using a transmission protocol.

15. The method of claim 10, wherein the subsequent action datum waypoint is a function of a strength and a weakness assessment taken during first action datum waypoint.

16. The method of claim 10, wherein generating a token as a function of the input from the action datum waypoint comprises the action identifier completing the action datum waypoint.

17. The method of claim 10, wherein detecting an edge further comprises connecting completed action datum waypoints.

18. The method of claim 10, wherein a collective string of all completed action datum waypoints is stored.

* * * * *